INVENTORS:-
Edgar Gretener,
Fritz Schröter,
BY Pierce, Scheffler + Parker,
Attorneys.

SECRECY COMMUNICATION SYSTEM

Filed April 20, 1951 3 Sheets-Sheet 2

INVENTORS:
Edgar Gretener and
Fritz Schroeter,
BY: Pierce, Scheffler & Parker,
ATTORNEYS.

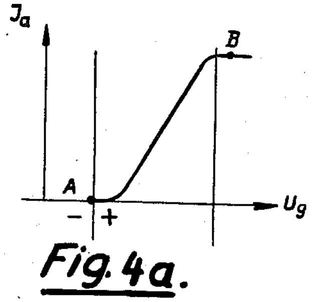
Fig. 4a.
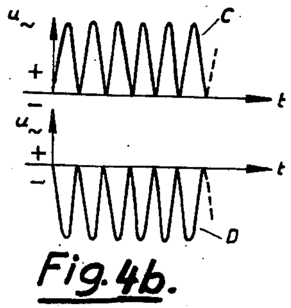
Fig. 4b.
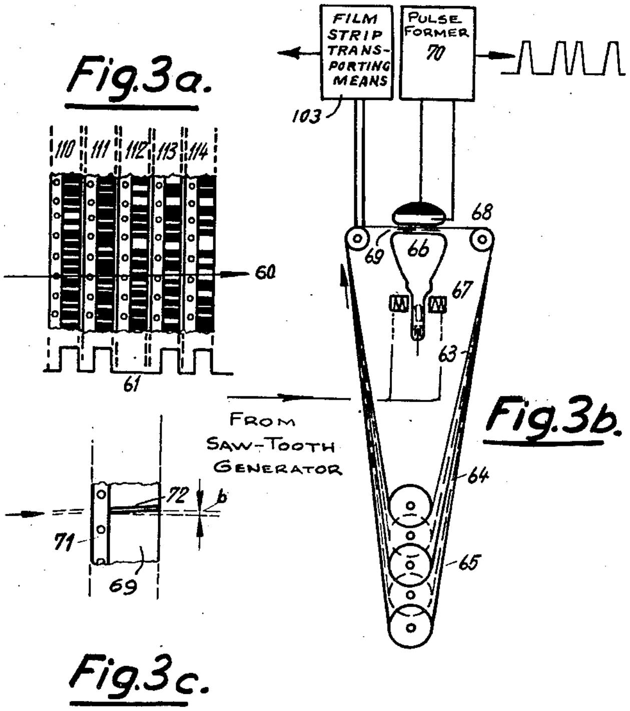
Fig. 3a. Fig. 3b.
Fig. 3c.
INVENTORS:
Edgar Gretener and
Fritz Schroeter,
BY: Pierce, Scheffler & Parker,
ATTORNEYS.

2,777,897
Patented Jan. 15, 1957

2,777,897

SECRECY COMMUNICATION SYSTEM

Edgar Gretener, Zurich, Switzerland, and Fritz Schröter, Madrid, Spain; said Schröter assignor to said Gretener Application April 20, 1951, Serial No. 221,996

Claims priority, application Switzerland April 22, 1950

8 Claims. (Cl. 179—1.5)

Figure 1A:
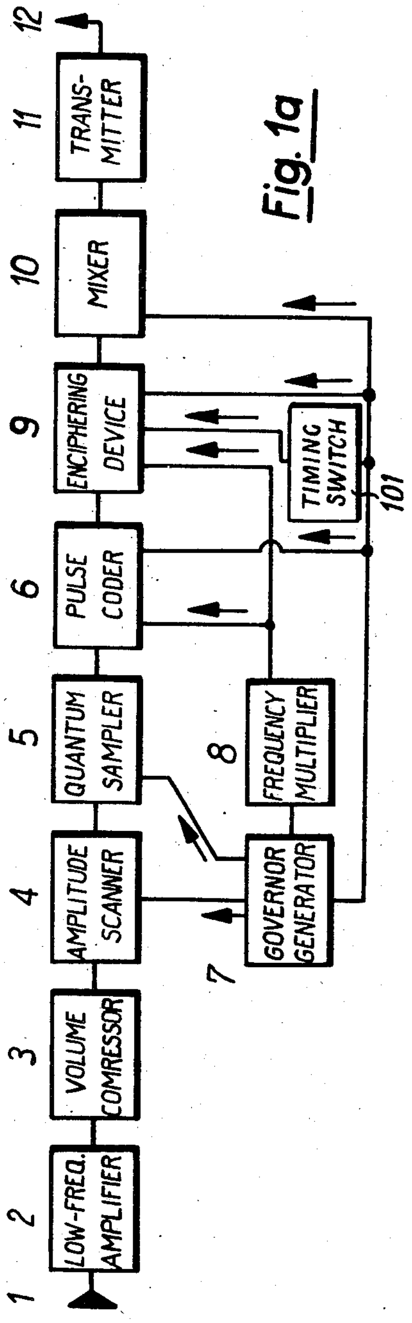

The present invention relates to secrecy communication systems for the transmission of speech, and particularly to secrecy communication systems of the type wherein the intelligibility of the communication to be transmitted is completely destroyed.

The problem of keeping secret speech transmitted over communication channels has not been solved up to date in a satisfactory manner in spite of the great efforts spent thereon. It is true that several useful methods have become known to secure a telephone communication channel against accidental understandable cross-talk. So e. g. the speech inversion method is employed for radio link calls, which as it is known, consists in modulating the original speech with a frequency $f_0$ located adjacent the upper limit of the frequency range to be transmitted. Thereby two sidebands are formed, one of which may be considered as the original frequency band inverted with respect to a frequency $f_0/2$ whereas the other one may be considered as the original band shifted along the frequency axis by $f_0$. Alternatively one or the other of said bands may now be employed for communication.

It is true that thereby speech is rendered more or less unintelligible thus securing it against accidental listening in as that may happen in the course of wireless communication. The degree of secrecy is, however, absolutely insufficient as regards intentional listening-in, as the reconversion of the disguised speech into clear speech is possible for any unauthorized person without technical difficulties.

Systems have been proposed warranting theoretically a considerable degree of secrecy against intentional listening-in. In such system the frequency range of speech is split into a great number of partial bands which are then each transformed separately. The law of splitting and transforming is varied, according to a predetermined program. Other systems propose cutting the whole message into short elementary intervals which are transmitted in permuted sequence.

As with all such systems expenditure and necessary technical outfit considerably increase if an increased degree of secrecy is required, and an economically sound solution is practically impossible. Though in rare cases such plants have been built and are actually in use it may be said judging from the point of cost that up to date no satisfactory solution has been realized.

The above remarks by no means intend to enumerate all existing possibilities. All of them, however, represent transformations which do not affect the physical nature of speech as the original mixture of such frequencies is only transformed by a more or less complicated method into another new mixture of frequencies which still bear a certain resemblance to the original speech.

Greatly enhanced possibilities arise if pulse code transmission is made the base of such enciphering systems. This kind of technique though now well known in the art of electrical communication will be explained in short in the following. "Pulse code modulation" consists in scanning the original mixture of speech frequencies (e. g. the current of a microphone) at an elevated frequency being at least the double of the upper frequency limit of the transmitted band, quantizing the scanned amplitudes and subsequently transforming the obtained quantum steps into corresponding pulse combinations. On the receiving side the transmitted pulse code message is retransformed into the original frequency mixture by the reverse process, viz. forming, synchonously to the rhythm of scanning on the transforming side, the appertaining amplitude value for each pulse combination.

The number of pulse units of a particular code, i. e. the number of pulses required for each individual amplitude value depends upon the volume of the communication to be transmitted. It is known that with a $n$-unit code $2^n$ pulse combinations may be formed and a corresponding number of amplitude steps may be transmitted. Good intelligibility may be obtained in case of telephone communication with a number of pulses $n=5$, i. e. with a 5-unit code. This means that the formation of 32 amplitude steps is apparently sufficient for telephone communication. If only a smaller volume is required satisfactory results may even be obtained with a 4-unit or 3-unit code.

It is an object of the present invention to provide a new and improved secrecy communication system which avoids one or more of the disadvantages and limitations of the prior art systems for keeping secret speech in communication systems.

It is a further object of the invention to provide means for keeping secret communication in speech transmission channels which will effect enciphering at a sufficiently elevated speed so as not to interfere with the quality of transmitted speech.

It is furthermore an object of the present invention to provide a practically unlimited degree of secrecy.

More specifically, it is an object of the present invention to provide a method for keeping secret speech in communication channels which is characterized by the fact that on the transmitting side the speech amplitudes are transformed into code pulses, which latter are then subject to a suitable enciphering process and transmitted in enciphered form, and that on the receiving side the enciphered code pulses are deciphered and the original code pulses decoded, whereby the original rhythm of speech is again obtained.

The fundamental and new feature of the invention resides in that the speech amplitudes are first converted into pulse combinations and are subsequently enciphered by employment of the highly efficient enciphering methods well known from telegraphy. The pulse combinations are obtained by continually scanning and quantizing the speech amplitudes and forming the appertaining pulse combination of a given multi-unit code in such a way that each particular pulse combination of the code corresponds to a speech amplitude lying in between two definite limit values, i. e. to all amplitudes corresponding to a particular quantum step. The variable amplitude of speech is thus transmitted by a sequence of pulse combinations. Such pulse combinations are similar to those employed in the art of telegraphy, the only difference residing in the face that in case of the transmission of speech the frequency range is considerably higher, viz. approx. 6000 combinations per second as compared to the average 7 combinations per second of telegraphy.

Then efficiency of the enciphering is obviously very high considering the fact that the reconversion of the enciphered pulse code combination into speech frequency without preceding deciphering, as that may be effected by an unauthorized person, leads to a spectrum of frequency the amplitudes of which have no resemblance whatsoever to the frequency spectrum of the speech.

Figure 1B:
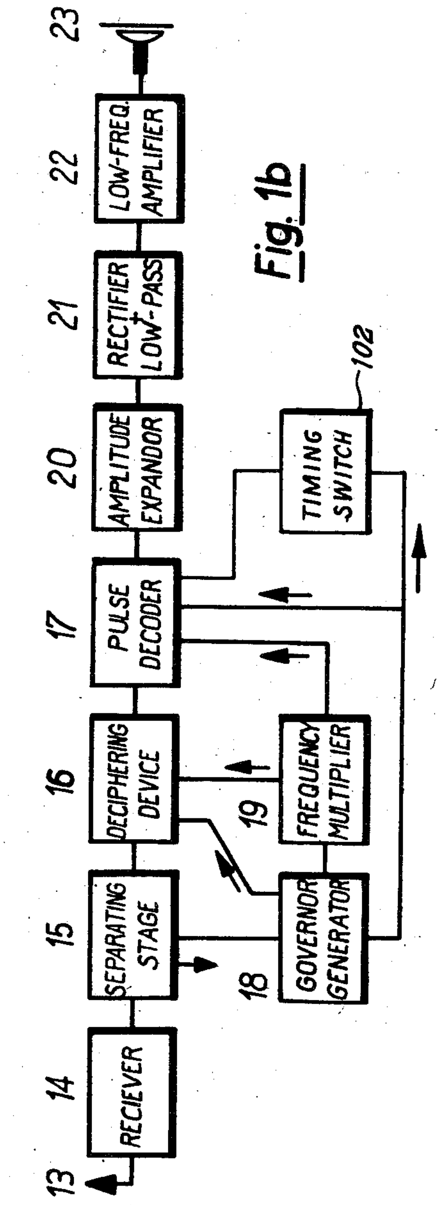
Figures 2A, 2B, 2C:
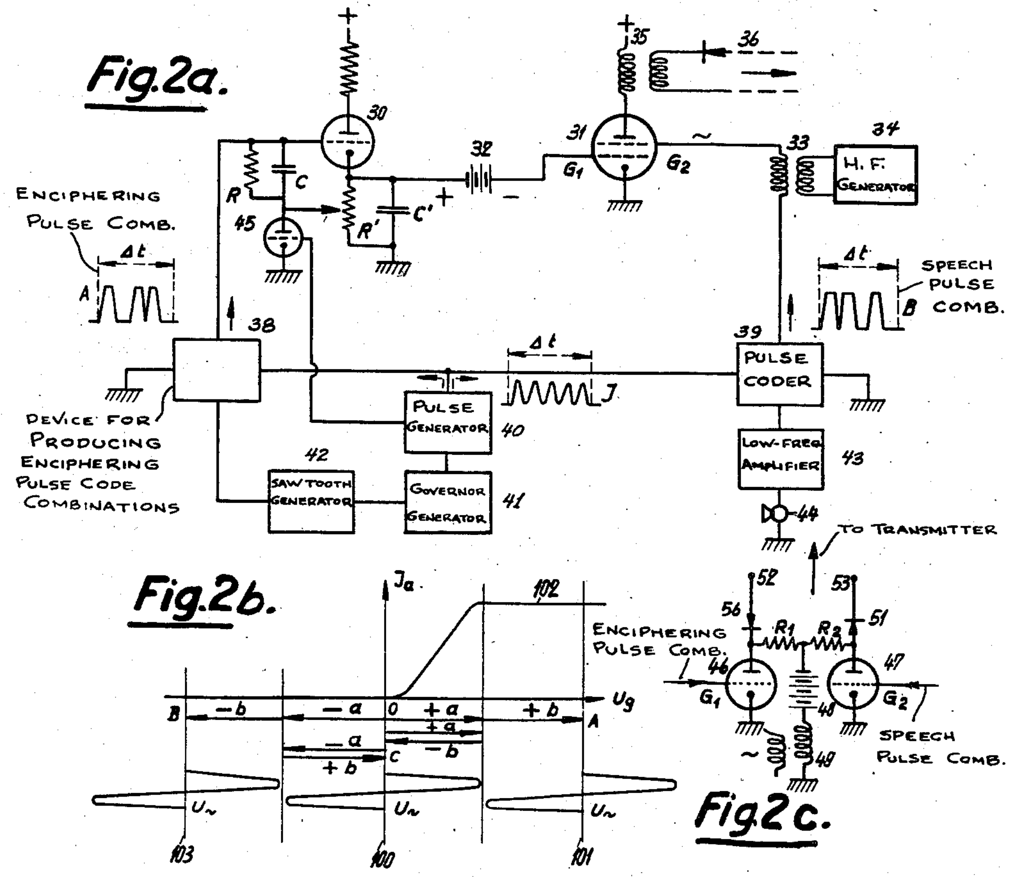

These and other objects and the advantages of the invention will be apparent from the following specification when taken with the accompanying drawings, in which:

Figs. 1*a* and 1*b* are schematic block diagrams of a transmitter and a receiver respectively of an embodiment for carrying out the invention;

Fig. 2*a* is a schematic wiring diagram of a circuit for combining speech code impulses and ciphering impulses;

Fig. 2*b* is a curve sheet showing the grid voltage-plate current characteristic of tube 31 of Fig. 2*a*, and showing the order of plate current swing for different combinations of applied grid voltages.

Figures 5A, 5B:
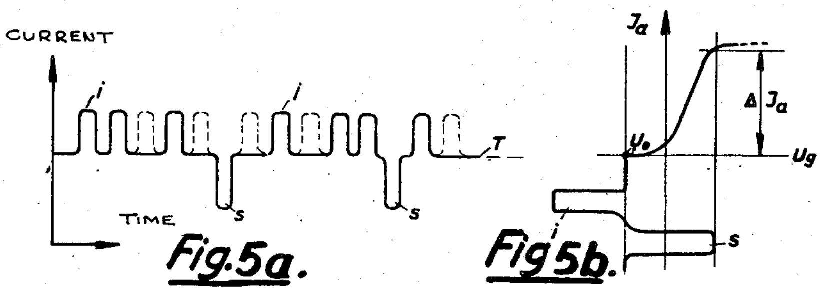

Fig. 2*c* is a fragmentary diagram of another tube arrangement for combining speech code impulses and ciphering impulses;

Fig. 3*a* is a schematic fragmentary elevation, in side by side relation, of film strips having selectively located transparent and opaque areas, for use in a photoelectric system for developing ciphering impulses;

Fig. 3*b* is a schematic view of a cathode ray tube and plurality of film strips in a pulse developing combination;

Fig. 3*c* is a fragmentary elevation of a slotted diaphragm arranged between the cathode ray tube and the photocell of Fig. 3*b*;

Figs. 4*a* and 4*b* are curve sheets illustrative of a method of combining impulses in a tube having a saturated grid voltage-plate current characteristic; and Figs. 5*a* and 5*b* are curve sheets in explanation of the sign and synchronization impulses in secret communication systems embodying the invention.

Figs. 1*a* and 1*b* by way of example represent schematically an arrangement, which is capable of executing the method accordingly to the present invention. Fig. 1*a* is the transmitter and Fig. 1*b* the receiver. For the sake of clarity a block scheme is employed showing the different devices, but which is not intended to indicate particulars of the constructive features or of the particular methods as far as they may be considered as being well known in the art. Where this is not the case, detailed explanation will, however, be given below.

Fig. 1*a* is the block scheme of a transmitter, consisting of a microphone 1 or its equivalent, e. g. pickup of a grammophone disc, of a sound film track or the like, a low frequency amplifier 2 comprising means for limiting the speech frequency band, e. g. to a maximum frequency $f_m$=3000 cycles per second, a volume compressor 3, which compresses the volume, preferably on a logarithmic scale, a scanning device 4 for scanning the microphone voltage, which is governed by a scanning frequency $f_s$ (e. g. $f_s$=6000 C. P. S.), a device 5, also governed by the frequency $f_s$, for quantizing i. e. transforming into quantum steps the microphone amplitudes scanned by device 4, a device 6 for transforming the quantum steps into multi-unit code impulse combinations, a governor generator 7, producing the frequency $f_s$, a frequency multiplier 8 producing the frequency $N.f_s$.; a device 9 for enciphering the sequence of impulse combinations produced by 6, a mixing stage 10 for mixing the code and synchronisation impulses (the latter possesses a frequency $f_s$), serving at the same time for suitably shaping the impulses, a transmitter 11 and an antenna 12.

A timing switch 101 serves to effect variation of the sequence of enciphering impulse combinations produced in device 9. This timing switch may be represented by electronic means or mechanical means in dependence upon the desired speed of variation as will be explained later on. In order that the frequency of switching be synchronized to the frequencies of encoding, timing switch 101 is connected to the governor generator 7. If the desired speed is low enough, electromechanical means may be employed which are known from the art of teletypewriting. They may thus comprise a synchronous clock synchronized to the governor generator which will give a current step to the enciphering current impulse producing device inside enciphering device 9.

The arrangement operates as follows: The microphone voltage is supplied to the input of the low frequency amplifier 2, which at the same time limits the frequency band, the volume of speech is reduced by volume compressor 3. Devices 4, 5, 6 serve to transform the amplitudes of speech into code pulse combinations. The scanning of the amplitudes in device 4 is effected with at least the double of the highest frequency $f_m$ to be transmitted, i. e. $f_s=2f_m$. The quantizing is effected by device 5 and the transformation of the quantum steps into code impulses by device 6. Means for this transformation of speech into code impulses have become well known from United States Patent 2,272,070 to A. H. Reeves and recent publications on pulse-code-modulation, for example the articles in Bell System Technical Journal for January 1948 (vol. 27) pages 1 and 44. Appropriate devices comprise among others by way of example:

(1) Tube devices in which the amplitude of speech is compared with graduated D. C. voltages, (2) Tube devices which employ the principle of impulse counters, (3) Cathode ray tubes with coding diaphragm.

The code impulse combinations obtained at the output of device 6 are supplied to the enciphering device 9. The enciphering process will be explained below in detail with reference to several examples. Device 10 serves for mixing code and synchronisation impulses. This device is required to ensure rigid synchronisation of transmitter and receiver for which purpose synchronizing impulses are to be transmitted along with the proper sign impulses through the transmitter 11 and the antenna 12.

It will be understood without further remarks, that the operation of the different devices must be effected synchronously and in correct phase relation. This is achieved by a governor generator 7 which governs and insures synchronism of the scanning, quantizing, production of code impulses and of the enciphering by means of a frequency $f_s$. A frequency multiplier 8 provides the frequency $N \cdot f_s$, which is required for the forming of impulses and for enciphering. The mutual interconnections for establishing synchronisation are apparent without difficulty from the arrows and the connexion lines in Fig. 1*a*. The question of synchronisation will be given a detailed consideration below.

Fig. 1*b* schematically represents a block scheme of the receiver arrangement. It contains the fundamental means, which serve to retransform into clear speech the message transmitted in enciphered and coded form. The receiver comprises an antenna 13, a receiver amplifier 14 with demodulator, a separator stage 15 for separating code impulses and synchronisation impulses, a deciphering device 16, synchronized with the enciphering device 9 of the transmitter, a decoding device 17, corresponding to device 6 of Fig. 1*a*, a governor generator 18 controlled as to frequency and phase by the separated synchronisation impulses, a frequency multiplier 19 for producing the governor frequency $N \cdot f_s$ for deciphering and decoding devices 16, 17, an amplitude expander 20, corresponding to volume compressor 3 on the transmitter side, a rectifier and low frequency-pass 21, a final stage amplifier 22, and a message producer 23 e. g. a loud speaker, a recorder device or the like.

A timing switch 102 similar to that employed at the transmitter again serves to effect variation of the enciphering impulse combinations. In order to ensure synchronous run of both timing switches at transmitter and receiver, synchronizing impulses may be transmitted and/or both timing switches may be synchronized by the local governor generators as shown in the drawing.

The processes of enciphering and deciphering which are effected at transmitter and receiver, respectively, are reverse to each other. The main feature, common to both is that the speech code, which has been formed on the transmitter side out of the scanned microphone amplitudes is combined with an invariable, or preferably a continually varying enciphering function. It is thereby enciphered in a complicated way and is transmitted in this unintelligible form to the receiver. Here it is once more combined with an identical enciphering function, which as the case may be, is varied synchronously to the enciphering function of the transmitter. The original impulse combination is thus again re-established by combining in an appropriate way each individual message code-impulse combination twice with the same enciphering function, i. e. once at the transmitter and subsequently at the receiver.

In the following only the case will be considered that the enciphering function is variable in time. The present invention in a more general way, however, also considers the employment of an enciphering function constant in time, and claims and specification are to be construed in this general way as a considerable progress may be achieved thereby, and a secrecy of communication be attained, which may prove satisfactory in certain cases.

The enciphering process employed thus corresponds in principle to the process already well known for teletypewriter communications. In that process every current step of the teletypewriter impulse combination is combined with a current step of an enciphering impulse combination produced by means of a very complicated mechanism. Due to the practically infinite permutation of the sequence of enciphering combinations the same combination will not occur again for the same impulse combination within a practically infinite lapse of time. A second combining process is effected at the receiver with an identical sequence of enciphering impulse combination so that the impulses of the clear text are again obtained. The combining of the current steps of teletypewriter and enciphering impulses is effected according to the following scheme, which is generally referred to as "multiplication of signs" or the "Vernam rule":

| 1. | | 2. | | 3. | | 4. | | 5. | | 6. |
|---|---|---|---|---|---|---|---|---|---|---|
| + | × | + | = | + | | + | × | + | = | + |
| + | × | − | = | − | | − | × | − | = | + |
| − | × | + | = | − | | − | × | + | = | − |
| − | × | − | = | + | | + | × | − | = | − |
| Transmitter | | | | | | Receiver | | | | |

The first vertical column indicates the polarities (or "signs") of the impulses produced by the teletypewriter, the second the polarities of the enciphering impulses. The third column shows the polarities of the resulting enciphered impulses which are transmitted to the receiver. The fourth vertical column shows the polarities of the incoming enciphered impulses at the receiver. The fifth shows the polarities of the enciphering impulses on the receiver side, which are identical to those produced at the transmitter. The sixth column represents the polarities of the deciphered impulses of the clear text (printing impulses), corresponding to the original teletypewriter impulses.

As has already been mentioned, the same process is employed according to the invention for the enciphering and deciphering of the speech code. The choice of the means for production and for variation in time of the sequence of enciphering and deciphering impulses, however, depends upon the determination of the rhythm of variation of the sequence. If utmost secrecy of speech is required the frequency of variation must be so high that no intelligible portion of the communication is transmitted during the interval between the variation of the sequence. This condition is opposed to the considerations of construction and electrical switching which tend to keep this frequency so low that means may be employed that have proved reliable for the enciphering of teletypewriter communication.

Thus for certain purposes a minimum frequency of variation of e. g. 5 variations per second may be sufficient for which frequency an electro-mechanical switching and control means will operate with sufficient reliability.

Cases demanding an extremely high degree of secrecy may, however, occur where a considerably higher frequency of the variation of enciphering and deciphering impulse sequence is required. In such cases preferably a purely electronic enciphering and deciphering device, e. g. a tube arrangement is employed. Such devices effect the variation of enciphering impulse steps, e. g. by the employment of the saw-tooth oscillations of multivibrators. Inertia-free switches and control means, e. g. cathode ray commutators may serve for controlling the sequence of ciphering impulses, as well as for the recording and playback of recorded ciphering impulses. The practical realisation of the numerous existing possibilities may be considered as being known in detail and will for that reason not be described. The employment of such electronic switching and permutation means is indispensable for carrying out the invention if the frequency of variation of ciphering impulses exceeds 100 combinations per second. This will be apparent from the following.

For exact reproduction of speech at least $2f_m$ scannings per second of the microphone voltage are required, if $f_m$ designates the highest accoustical frequency to be transmitted. After transformation of the quantized amplitude into corresponding code impulse combinations a frequency band $$f=2f_mN$$

is required, where N is the number of current steps of the code impulse combination. In general N will be equal to 5. With $f_m=3$ kc.p.s. and $N=5$ this leads to a frequency band of 30 kc.p.s. In this case the microphone voltage is scanned 6000 times per second and 6000 code impulse combinations must be formed. Correspondingly only approximately $\frac{1}{6000}$ of a second is provided for the transformation of the individual amplitude values into the impulse combination of the 5-unit code or for reconversion of such combinations into speech amplitudes at the receiver, so that electronic means must needs be employed for coding and decoding. In order to effect the variation of the sequence of ciphering impulse combinations after every combination or even after every current step thereof, the invention provides the employement of electronic means for enciphering and deciphering of the code impulse combination. Electronic means are employed in any case in which the frequency of variation exceeds a value of 100 combination per second whereas in case of frequencies of the order of 5 combinations per second electromechanical devices are employed.

In the latter case it must be taken into consideration that in spite of the low frequency of variation the change-over from one ciphering function to another must be effected within only approx. $\frac{1}{40,000}$ sec. (with respect to the data chosen above for $fm$ and N). Mechanical means being incapable thereof the invention provides employment of two identical electromechanical ciphering devices at transmitter and receiver, respectively, which are alternately employed. The device not employed in a given moment thus has sufficient time to effect the variation of the ciphering function during that interval. Synchronisation means required for coding and decoding will advantageously be employed to effect this variation synchronously at transmitter and receiver. The change-over from one device to the other is likewise effected synchronously, but not by mechanical means, but electronically, e. g. by blocking or deblocking tube grids. It may thus be executed in the short interval between two succeeding code signs, i. e. within an interval which is small compared to $\frac{1}{40,000}$ sec. (where $\frac{1}{40,000}$ sec. is approximately the duration of an individual impulse). Such electronic means will be explained below with reference to Figs. 2*a* and 2*c*.

Electronic means, employed to effect variation of the ciphering function at higher frequency or electromechanical means operating at lower frequencies must both meet certain requirements to afford a satisfactory secrecy. The same enciphering impulse combination must not be transmitted more than once within a sufficiently long interval for one and the same amplitude of the speech current. This is achieved by combining the impulse combinations of the speech or clear text with a continually varying sequence of ciphering impulse combinations which in the ideal case are distributed at random. The term "combining" may represent that e. g. the polarity of the current steps is commutated or that "marking current" is exchanged for "separating current" (or "spacing current") or vice versa. In order to effect this combining, the impulse combinations of the clear text formed according to the principle of "Pulse-Code-Modulation" may be commutated, i. e. the respective polarities or "signs" of the individual current step be multiplied with the signs of current steps of a continually permutated sequence of ciphering impulse combinations produced by the ciphering device. The same process is effected once more after transmission to the receiver in a synchronously operated deciphering device thereof, whereby the original clear impulse combination is again obtained.

The high frequency at which this combining is to be effected demands the employment of electronic tubes. The code impulses and the enciphering impulses, e. g. are supplied to the control grids of such tubes and the plate current resulting from the simultaneous effect of both represents the enciphered code impulses which serve to key the transmitter. Code and enciphering impulses must be of identical character and are preferable given equal amplitudes. It is obvious that they must have the same length in time and the same synchronous rhythm. A great number of switching means must be employed for the above purpose which may all be listed within two categories:

(1) Normal grid controlled electronic tubes (triodes, pentodes etc.). As the plate current passes only in one direction they also provide conductance only in one direction. Commutation can therefore be only effected (Fig. 2*b*) indirectly, e. g. by employing the voltage drop produced by the plate circuit across an exterior resistance with respect to a constant potential of intermediate value. Further details will be given below with regard to Figs. 2*a* and 2*b*. The advantages of such arrangements consist among others in the fact that the above mentioned "multiplication of signs" may be brought back to the algebraic addition of two grid voltages (tube 31 in Fig. 2*a*).

(2) Tubes with controlled secondary emission. They may directly effect a commutation of the current through the secondary-emission (SE) electrode by raising or lowering the potential of a "draw-grid" located in front of said SE-electrode and acting as anode. If the draw-grid is made negative with respect to the SE-electrode by several volts, no electrons may issue therefrom. A negative current will flow into the SE-electrode. If, however, the draw-grid is slightly positive with respect to the SE-electrode the secondary electrons set free by the bombarding primary electrons may leave their sites and move to the draw-grid. A negative current will issue from the SE-electrode. Here real commutation is effected. This process may be employed in the present case, e. g. in such a manner that a cathode ray is periodically led across a plurality of contacts consisting of a material capable of secondary emission. These contacts correspond to the individual steps of the code impulse combination to be enciphered. While the cathode ray successively scans the contacts, the potential of a draw-grid common to all contacts is increased or decreased by the sequence of enciphering impulse combinations. Thereby a "multiplication of signs" according to the invention is obtained.

The mixing of sign impulse combinations with the enciphering impulse combination may be effected e. g. according to Fig. 2*c*. This figure represents a differential arrangement of two tubes 46 and 47. Both kinds of impulses are supplied to the control grids $G_1$, $G_2$ of tubes 46 and 47, e. g. code impulses to $G_2$ and enciphering impulses to $G_1$. Plate current is supplied to both tubes by a common D. C. source 48 which lies in series with a high frequency coupling 49 which transmits only frequencies considerably higher than the impulse frequency. The plate circuit resistances $R_1$ and $R_2$ are equal in value and the anode capacities are also equalized. The impulses supplied to grids $G_1$ and $G_2$ are given equal amplitudes e. g. by means of amplitude limitation. It is obvious that in case of equal polarity of the impulses no voltage difference exists between the anodes of tubes 46 and 47, whether this polarity be "+" or "—." If, however, the polarity of the impulses differ on both sides, an alternating high-frequency voltage exists across resistances $R_1$ and $R_2$. This voltage is rectified by the rectifiers 50 and 51 and serves as control voltage for the transmitter.

Photocells have to be listed in the above mentioned category (1), as they pass current only in one direction. An example for their application will be given by Fig. 3*c*.

Another circuit for combining sign and ciphering impulses is represented by Fig. 2*a*. It comprises a triode 30, a tube 31 with two grids $G_1$ and $G_2$, a regulable direct current source 32, high-frequency coupling means 33 for superimposing a high-frequency voltage on grid $G_2$ of tube 31 from a high-frequency generator 34, the frequency of which is considerably higher than the frequency of the impulses. A second high-frequency coupling means 35 serves to separate high frequency which is rectified by a rectifier 36 and serves to key the transmitter. Two resistances R and R′ and the parallel capacitor C and C′, respectively, are disposed in the grid and plate circuit of a tube 30. The time constant R′.C′ of the one pair must be sufficiently smaller than the duration of the individual impulse, whereas C′ must be large enough to suppress any back coupling effects of the plate current produced on R′ and to retain a sufficiently large positive charge during the duration of an impulse. This positive charge is effected by the plate current through tube 30. The time constant valid for charging capacitor C′ can be made sufficiently small with respect to the flange duration of a normal impulse by choosing a tube with a low interior resistance. If, however it is impossible to realize a sufficiently small time constant R′.C′ of discharge in view of the above other requirements, a tube 45 may be shunted to C′, R′. Tube 45 is periodically made conductive by the back flanges of the impulses produced in pulse generating device 40 whereby the back flanges of the impulses transmitted to grid $G_1$ of tube 31 conserve the desired steepness. A formation stage may, if necessary, be inserted before grids $G_1$ and $G_2$ of tube 32 to normalize the form of impulses and to equalize the amplitudes thereof, if the latter is not effected by pulse coder device 39.

The governor generator 41 controls a saw tooth generator 42 developing a saw tooth current which is directly supplied to the enciphering device 38. Generator 41 simultaneously governs the formation of impulse current steps with equal displacement in time in device 40, e. g. five-unit impulse combinations J with a total duration of $\Delta t$. These impulses are supplied to the coding device 39, and to the enciphering device 38. The coding device 39 comprises any known or desired means for scanning, quantizing and transforming the speech amplitudes which are received from microphone 44 through an amplifier 43. The coding device 39 may in a given moment $\Delta t$ produce e. g. a code impulse combination B. The corresponding enciphering impulse combination produced at that moment by device 38 may be e. g. the ciphering impulse A. Combining by ways of "multiplication of sign" of both combinations is effected as follows: The positive amplitudes of group A render conductive tube 30. The plate current flowing through R′ produces a charge in condenser C′ which counteracts the negative voltage produced by the current source 32 and which by means of grid $G_1$ blocks tube 31 so that the grid voltage changes into positive. The impulses of group A with zero amplitude again render nonconductive tube 30 and thereby block tube 31 through grid $G_1$. Consequently, according to the polarity of the enciphering impulse combination either unblocking or blocking impulses are obtained at grid $G_1$ of tube 32. The speech code impulses together with a high frequency oscillation superimposed by devices 33 and 34 are supplied synchronously to the ciphering impulses to grid $G_2$ of tube 31 by the message coding device 39. The effect thereby produced is shown by Fig. 2*b*, representing the characteristic of tube 31. This tube is fitted with a wolfram or thorium cathode, whereby a pronounced saturation effect of the plate current $J_a$ is obtained. The plate current $J_a$ is plotted symbolically as a function of the controlling grid voltage $U_g$. This controlling grid voltage $U_g$ represents the combined effect of the voltages applied to either control grid $G_1$ or $G_2$, and may be considered as the sum of these grid voltages. The code impulses B carrying the speech are supplied to grid $G_2$ from the coding unit 39, and a high-frequency oscillation U is superimposed on grid $G_2$ which is supplied by a H. F.-generator 34 through the coupling means 33. The amplitude of the code impulses supplied to grid $G_2$ may assume a value "*a*" and may be either positive (+) or negative (−). The amplitude of the enciphering pulse combinations may assume a value "*b*" and may be either positive or negative. The code impulses A are produced by the device 38 and supplied to grid $G_1$ as above described. The "quiescent point" O of the tube is located at 100 by applying a suitable bias voltage to grid $G_2$. Means employed for this purpose have not been shown in Fig. 2*a* for the sake of clarity. If impulses with amplitudes "*a*" or "*b*" are applied to the grids $G_1$ or $G_2$ as indicated above, the operating point is shifted by the combined effect of the two grid voltages. It is obvious that in case of "$(+a)+(+b)$" the operating point is shifted to 101, i. e. far into the area of the saturation current 102. Consequently the high frequency oscillation U∼ superimposed to $U_g=(+a)+(+b)$ cannot produce a H. F. modulation of the plate current. Capacitive components of U∼ are eliminated by neutralizing means. The simultaneous occurrence of "$(-a)+(-b)$" shifts the operating point to 103 and likewise cannot produce a high frequency component of the plate current as $J_a$ is zero all over the entire area covered by the superimposed oscillation U∼. In contradistinction to this amplitude, the combinations "$(+a)+(-b)$" and "$(-a)+(+b)$" do not shift the operating point. In both latter cases the positive half wave of U∼ effects a plate current and produces a H.-F. modulation thereof. This H.-F. current is supplied to the transmitter through the coupling means 35 and the rectifier 36. The rectifier current may operate the transmitter in either sense, i. e. block or deblock the transmission. With regard to the desired effect only the one fact is important, viz. that the sign combinations "+ *x* +" and "— *x* —" affect the transmitter in the one same sense whereas the sign combinations "+ *x* —" and "— *x* +" produce the reverse effect. A suitable choice of the time constant of the rectifier circuit 35—36 will prevent the high frequency oscillations superimposed on the flanges of the impulses A and B from reaching the transmitter.

An example for the photo-electric production of the sequence of ciphering impulse combinations is represented by Figs. 3*a*–3*c*. The embodiment shown by Fig. 3*b* comprises a cathode ray tube 66 with deflecting means 67. A photocell 68 is located opposite to the screen of tube 66 and the output thereof is supplied to an amplifier 70. A number of film strips 64, equal to the unit member N of the employed impulse code, and each related to one of the current steps of the message code impulses are located between tube 66 and photocell 68. As shown by Fig. 3*a* the narrow film strips 110—114 are arranged side by side approximately at right angles to the direction 60 of the scanning light beam. The strips are exactly guided by means of perforations and are transported in steps of identical length. The strips are given the form of loops with different length. The surface of each film is divided into black, i. e. opaque, or white, i. e. transparent strips. The black or white strips are applied to the film by a photographic or mechanical printing process. In view of the above consideration black and white strips should be distributed at random. This may be effected by employment of a mechanical enciphering device as will be explained below. By suitable choice of the different lengths of the five strips 110—115 so that e. g. the total numbers of unit steps on each film are prime numbers without common denominator. The probability of occurrence of the same ciphering impulse combination thus is extremely low and if the total number of steps is without common denominator, the ciphering film loops may effect a very great number of revolutions before all five strips once more assume the original position of departure. Additionally the strips may be interchanged or replaced by others after every communication. If the breadth of an individual strip on the film be 0.2 mm. and the film is transported after each impulse combination the feed of the film must be 120 cm. per second for 6000 codes per second. It must be only 20 cms. per second for 1000 codes per second, i. e. for a variation of enciphering combination after every 6th transmission of enciphered message code impulse combinations. If the speed is still lower, e. g. in the neighborhood of five to ten times per second, the film strips may be stepped by a film transporting device 103 which is synchronized by the timing switch 101 and 102 of Figs. 1*a* and 1*b*. Thereby it is ensured that the film strips are stepped by a single individual step just during the period intervening in between two enciphering impulse combinations. The transparent or opaque areas of the film strips 110—115 are transported with constant velocity and are scanned during transport by a light spot traversing the strips in the direction of arrow 60. By the light alternately transmitted and blanked off the impulse combinations e. g. 61 are formed in the circuit of the photocell 68 arranged behind the film strips 64. To ensure that only one of the black or white areas is scanned at a time, a diaphragm 69 is inserted in between tube 66 and cell 68. The direction of the scanning light spot is slightly oblique, as shown by Fig. 3*c*, i. e. the slot 72 of the diaphragm is inclined to the direction of scanning by an amount *b* corresponding to the displacement of the film 71 during the passing of the light spot across the slot. This measure ensures either occultation or transmission of the scanning light all over the width of each film strip.

The different lengths of the film loops 64 is shown in Fig. 3*b*. The cathode ray tube 66 the deflection system 67 of which is fed e. g. by a saw-tooth current from device 42 of Fig. 2*a*, provides a sharp inertia-less scanning light spot, which is blanked off during the retrace period. The light spot of the cathode ray tube may illuminate directly the film strips without an intermediate projection optics if a diaphragm 69 is employed and if the photocell 68 is located immediately behind the film. Amplification, limitation and formation of the enciphering impulses current steps is effected in device 70 which also comprises the additional means for cutting-off the retrace beam and for broading the impulses and so on. The device shown by Fig. 3*b* must be considered as being contained in or an alternative for the enciphering impulse device 38 of Fig. 2*a*.

The cathode ray tube 66 may be replaced by a mirror wheel of suitable division with synchronous drive. Such a wheel due to the inertia-less nature of the beam deflection is also capable of effecting the scanning of film strips which are transported according to a predetermined law, e. g. separately and reversely and thus obtain additional permutation of the enciphering impulse sequence.

Less complicated constructions are obviously obtained if in case of reduced requirements of secrecy an invariable function will be sufficient. In this case the means for producing continuous variation of the enciphering function may be dispensed with.

According to the general rule as already explained the enciphering impulse combinations are combined on the transmitter side with the impulse combinations of the original speech and the same process occurs once more on the receiver side in order to reconstitute the original speech code combinations. The corresponding combinations are preferably combined according to the already mentioned scheme of "multiplication of signs" for enciphering or deciphering respectively:

$+ \times + = +$ (e. g. marking current)
$- \times - = +$ (e. g. marking current)
$+ \times - = -$ (e. g. spacing current)
$- \times + = -$ (e. g. spacing current)

Enciphering and deciphering thus are identical or inverse processes, which are carried out by the employment of practically identical means, e. g. by influencing separate grids of a multi-grid tube or, the grid circuit of a triode. In distinction to these possibilities a saturated tube characteristic $J_a=f(U_g)$ according to Fig. 4*a* may be employed as follows: Positive code impulses ("+") displace the operating point of a tube to A by means of suitable voltage in the grid circuit. Negative code impulses ("—") displace the operation point to B. The enciphering impulses are formed by a rectified alternating voltage according to Fig. 4*b* of sufficiently high frequency which for positive impulse steps ("+") assumes the form represented in the upper diaphragm C, for negative impulse steps ("—") the form represented in the bottom diagram D. The two rectified voltages are opposed, i. e. the one is obtained from the other by simple commutation. As will be seen of a voltage C applied to the tube with the operating point at A produces a high frequency plate current representing the case of "$+ \times + = +$" i. e. "marking current". The same result is obtained if a voltage D is applied to the tube and the operating point being located at B which corresponds to the case "$-\times- = +$," i. e. likewise "marking current." In contradistinction thereto the two other combinations viz. voltage C applied to operating point B and voltage D applied to operating point A, do not produce any high frequency plate current i. e. "spacing current" is obtained. The same process is employed at the receiver side to reconvert the enciphered impulses into clear text impulse combinations.

The combination of code and enciphering impulses may also be effected by controlling the phase of two alternating currents of equal frequency by the code impulses or by the enciphering impulses, respectively, and by subsequent addition of both currents. Initially the phases of both currents are adjusted so that for the relative phases $0, \pi$ or $2\pi$ ( $=0$) either the maximum of interference or, in case of equal amplitudes, a zero voltage ("spacing current") is obtained.

The devices for coding and decoding speech as well as the devices for enciphering and deciphering on the transmitter and the receiver side, must be synchronized. Both may be effected by the same means, e. g. the already existing governor generators and, if necessary lower frequencies be derived from the governor frequency. If a certain maximum phase error, e. g. 10% is admitted, the phase deviation occurring within the interval between two subsequent corrections of synchronism must not be greater than this value. Synchronisation may be effected by two independent governor generators of high constancy, e. g. temperature constant tuning forks with back-coupling excitation through electronic tubes or temperature constant quartz-oscillators. In this case synchronisation with a maximum error of $10^{-8}$ of the standard value may be expected. With a scanning frequency of 6000 C. P. S. starting in correct phase the maximum phase error is attained after an interval of $1.67 \times 10^{3}$ seconds, i. e. more than the normal duration of a telephone call. It would be sufficient to effect comparison of the phases from time to time between the succeeding communications and to correct the existing deviation.

In general rigid synchronization of the receiver will be preferred, either independence upon the rhythm of the code impulses themselves as generally employed in telegraphy or by special synchronizing impulses.

For separation of the simultaneously transmitted impulses a method may be employed similar to the separation of brightness and synchronization impulses in television. The enciphered code impulses *i* are directed in one direction and the synchronisation impulses S in the other direction with respect to a separating threshold T according to Fig. 5*a*. As is seen the synchronisation impulses are located in the "start-stop" interval. Separation is effected at the transmitter by a suitably biased tube acting as amplitude separator in a way well known to anybody skilled in the art, e. g. according to Fig. 5*b*. The impulse mixture is superimposed on the bias voltage $U_0$ at the foot point of the tube characteristics. Only the synchronisation impulses S produce a modulation of the plate current $J_a$, whereas the code impulses *i* are suppressed.

Another method for separating the synchronization impulses on the receiving side consist in distinguishing them from the code impulses by their duration: In this case the employment of a separating threshold is not necessary. E. g. the start (or the stop) impulse which is employed for the purposes of synchronisation is given a longer duration and is separated by a R. C. member. The longer synchronisation impulses produce a charge on the condenser which exceeds a certain value, whereas the shorter code impulses will not attain this value. Thereby the grid of a tube is opened, and the phase of the anode current may now be compared with the phase of the local synchronisation governor generator. The result of this comparison may serve in well known way to control the frequency of the local governor generator of the receiver.

The synchronisation of the receiver side in any case implies keeping in step a local generator or, as the case may be, a rotational movement or any other process by means of the separated synchronisation impulses, comparison of phases or by direct control, follow-up methods or the like. As the operating frequency of enciphering and deciphering is either equal to the operating frequency of coding and decoding, or, as the general case will be, lower but an even-number partial frequency thereof, it is possible to employ the same control factor for synchronisation of the deciphering and decoding on the receiver side.

If separately controlled governor generators are employed, they will serve as master generators, from which all necessary higher or lower control frequencies are derived.

The enciphering method according to the present invention may be combined with all known methods of speech enciphering, e. g. as they have been mentioned in the introduction, if such methods after enciphering provide an amplitude modulation capable of being coded. Thus "band splitting" may be employed previously to coding and enciphering according to the present invention. On the receiver side the reverse of the preliminary enciphering process is effected after deciphering and decoding and only then the original speech regained. The degree of secrecy is thereby raised by a further step.

It is furthermore possible to vary continually in the coding means the relation between the quantized amplitude steps and the impulse combination of the code and to effect variation of the said interrelation synchronously and in phase therewith at the receiver. Up to date it was usual for speech transmission by code modulation to select the code impulse combinations in such a manner that the "weight" of said combinations increases or decreases with the value of the appertaining quantum amplitude. The "weight" of an entire code impulse combination is obtained by adding the "weight" of the individual current steps, which corresponds to the numerical order in which said steps appear in the combination. E. g. the first step will have a weight of "1," the second of "2," the third of "4," the fourth of "8" and so on. This interrelation is varied according to the present invention by continually permuting the correspondence of amplitude step and impulse combination. The scheme of interrelation valid for a given moment will be exchanged for another scheme in continuous permutation and so on. The invention may be realized in a particularly simple manner if cathode ray tubes with a diaphragm are employed for coding and decoding: E. g. the code may comprise 5 units so that the cathode beam at the transmitter assumes $2^5=32$ positions of deflection proportionally to the amplitude of the quantized speech. These positions are numbered 0–31. A second decoding diaphragm with the same number of positions is added to the first one whereby (2×32)=1,=63 coding position of the beam with equal intervals are obtained. Two thereof produce the same impulse combinations, e. g. position 0 and 32, 1 and 33, 2 and 34 and so on. In order to permute the interrelation of impulse combinations and speech amplitudes and additional variable deflection voltage is superimposed to the deflection voltage corresponding to said amplitudes. Said additional voltage may assume 32 different steps according to a predetermined scheme or in an ideal case, at random variation. This additional deflection voltage is e. g. produced from film strip with fields of variable density similar to the films shown by Figs. 3*a* and 3*b*. This film strip will provide a certain additional deflection value for each current step and the velocity of transport must be in synchronism with the impulse frequency of the code. At the receiver a corresponding film strip is operated synchronously to the transmitter and provides an additional deciphering voltage, which is inverse with respect to the additional deflection voltage produced at the transmitter. If constant voltage 32 is added to the amplitude values retransformed at the receiver by the normal decoding means and the synchronised additional deciphering voltage is now subtracted from this sum, the original amplitudes of speech are again obtained. The means required for this operation are well known to anybody skilled in the art.

Two examples will be given here:

| Transmitter | | | | Receiver | | | |
|---|---|---|---|---|---|---|---|
| Original speech amplitude | Additional deflection voltage (1) | Sum | Code group according to deflection voltage | Retransformed amplitude voltage | Constant voltage | Sum | After subtraction of additional voltage (1) |
| 17 | 16 | 33 | 1 (=33-32) | 1 | 32 | 33 | 17 |
| 11 | 29 | 40 | 8 (=40-32) | 8 | 32 | 40 | 11 |

This way of enciphering unites at the transmitter the steps of coding and enciphering, at the receiver the steps of decoding and deciphering in one process which may be effected in one and the same device. Further independent enciphering of the code impulse combination before transmission and correspondent deciphering at the receiver before decoding, as described above may be added.

The combination of enciphering and coding in case of an eventual analysation simulates the existence of frequencies which are not produced by the microphone as is shown by the following table. E. g. 6000 scannings of the microphone voltage are effected per second and it is stated that the amplitude thereof monotonously increases in the course of every 10 scannings as shown in column 1 from quantum step 0 to 32 or vice versa. This means that the characteristic frequency 300 C. P. S. is an essential component of the spectrum of the microphone voltage. Due to the described permutation of the interrelation of amplitude steps and code impulse combinations in case of analysation will appear e. g. as column 2:

| Original speech amplitude (already quantized) | Transformed by additional deflection voltage |
|---|---|
| 1 | 31. |
| 2 | 1. |
| 3 | 30. |
| 4 | 2. |
| 5 | 29. |
| 6 | 3. |
| 7 | 28. |
| and so on | and so on. |

The sequence of quantums according to column 2 would seem to indicate an accentuated modulation frequency of 3000 C. P. S. which in reality is not contained in the microphone spectrum.

Generally speaking, the above ciphering method according to the invention provides a continual permutation of the frequency distribution of speech, and thus provides an extremely high degree of secrecy.

As already mentioned $3.10^4$ impulses per second, corresponding to a 5-unit impulse code, are just sufficient to transmit a speech frequency band of 3000 C. P. S. (=6000 scannings per second). With the aid of electronic devices it is still possible to encipher each impulse separately by the employment of recorder means which store the sequence of enciphering impulse combinations and which within the scope of this invention comprise "endless" photo-electrically scanned registering film strips or magnetically scanned recorder wires or magnetophone tape and similar means. In order to avoid excessive velocities of transport of the latter several carriers, wires or tapes may be employed in parallel similarly to Fig. 3*a*. These carriers are subsequently scanned so that carrier 1 carries the first impulse, carrier 2 the second impulse of a combination and so on. After all carriers have been scanned the scanning begins anew on carrier 1, which has been transported by the breadth of a recording element. If film is employed as carrier the construction is simpler as the breadth of the film is sufficient to accommodate a multitude of recordings which are scanned crosswise to the direction of transport. If e. g. the scanning light spot measures .3 mms.×.3 mms. a film of standard width may accommodate 75 recording elements as transparencies and densities, corresponding to 15 complete impulse combinations of a five-unit code. As shown in Fig. 3*a* the elements are either black, i. e. opaque, or transparent spots covering only the area of the scanning light spot. The light flux thereof is therefore alternately absorbed or transmitted. During the traverse sweep over these 75 recorder areas the film is transported by .3 mms. In order to encipher 6000 codes per second the film must be transported by 120 mms. per second. A film of 72 ms. length may thus accommodate the sequence of enciphering impulse combinations sufficient for 10 min. of communication. The photoelectric transformation into current impulses is effected as already described with reference to Fig. 3*a*. A multi-mirror wheel may also be employed as deflection means for the light spot which transversely scans the slowly moving film strip.

The employment of a storage film having the length of an entire communication offers great advantages. The ciphering function is readily registered on the strip, which may be easily replaced by a differently marked strip. Synchronisation and phase equalisation of transmitter and receiver strip is easily effected. If only the storage of enciphering impulse combination of identical amplitude is envisaged, the film strip need provide only either opaque or transparent areas. In order to produce such strips, a mechanical enciphering device of low speed may be employed as that is well known from telegraphy. The input of the device is fed with constant impulses, the frequency of which is adjusted to the transverse scanning and the transport of the film. A light source is focused on said steps and is controlled by said device in such a way that e. g. a "+" polarity produces illumination, a "—" polarity occultation. In case of magnet registering analogously the recorder magnet takes the place of the controlled light source, and the reproduction magnet takes the place of the photocell for the reception of the commandos from the carrier. In this manner the sequence of enciphering combinations is photographically registered on the film and the practically unlimited possibilities of permutation of such known device are fully exploited. This is important as mentioned above as the individual combination should be, if possible, distributed at random i. e. the same enciphering combination must not be combined with the same code sign during the duration of a call, or at least the length of the film.

If the above described simultaneous coding and ciphering in the same device is envisaged, if therefore a enciphering voltage of varying amplitude is to be algebraically added to the quantized deflecting speech amplitude, the variations of the additional voltage are to be registered on the film strip on the wire recorder tape or the like which may be recorded as variable transparency, or as variable area. For this purpose the values to be registered are quantized by the same means, employed for the purposes of coding, and transferred to the film strip, e. g. by a light valve known from the technique of sound film (variable area recording). The film strip now serves as ciphering diaphragm. In order to provide a random distribution of amplitudes a sequence of sounds, if possibly inarticulated, e. g. produced by a sound film or recorder tape run in reverse direction, is fed through amplitude limiters, quantizing and scanning means to the photo-electric or magnetic recorder. In place of the registering of inarticulated sounds also registration of the mixture of a speech frequency band which is to be transmitted, may be employed.

We claim:

1. A method for keeping secret speech in communication channels, said method comprising converting the audio speech waves to an electrical speech message signal varying in frequency and amplitude with the audio speech waves, converting the speech message signal to a second signal of code pulse combinations significant of the amplitudes of the speech message signal, combining an enciphering pulse combination with each code pulse combination to develop an enciphered pulse signal, transmitting the enciphered pulse signal to a receiver station, deciphering each received pulse combination by combining therewith the identical pulse combination employed for enciphering the same, thereby to develop the original code pulse combination, and converting the developed code pulse combination back to the original speech message signal.

2. A method for keeping secret speech in communication channels, as recited in claim 1 and which includes the further steps of combining with the code pulse combinations of said second signal an invariable sequence of different enciphering pulse code combinations.

3. A method for keeping secret speech in communication channels, as recited in claim 1 and which includes the further steps of combining with the code pulse combinations of said second signal an invariable sequence of different enciphering pulse code combinations, and repeating said sequence at a repetition rate greater than five per second.

4. A method for keeping secret speech in communication channels, as recited in claim 1 and which includes the further steps of combining with the code pulse combinations of said second signal an invariable sequence of different enciphering pulse code combinations, and repeating said sequence at a repetition rate greater than one hundred per second.

5. In the transmission of speech message signals by converting the speech signals at the transmitter station into a sequence of code pulse combinations significant of the speech amplitudes, transmitting the sequence of code pulse combinations to a receiver station, and converting the received sequence of code pulse combinations back to the original speech message; the method of maintaining secrecy which comprises the steps of converting the speech signal into a sequence of mark and space pulses according to a constant code relation of pulse groups to speech amplitudes, then multiplying each such group of code pulses by the same number of mark and space pulses arbitrarily arranged according to a continuously varying enciphering sequence, and multiplying each received group of enciphered code pulses by the same arbitrarily arranged group of mark and space pulses as was employed at the transmitter station to develop that group of enciphered code pulses, thereby to obtain a deciphered group of code pulses duplicating the sequence of mark and space pulses originally developed at the transmitter station, and converting said group of deciphered code pulses back to the original speech message.

6. In the transmission of messages by converting the messages into code groups of N mark and space signals significant of the amplitudes of different frequencies of the message according to a preselected code, the method of developing continuously varying groups of N mark and space signals for combination with code pulse signals significant of the message which comprises the steps of storing trains of arbitrarily arranged sequences of mark and space signals on two sets of N carriers of different lengths, the identical sequence of signals being stored on those carriers of the two sets which are of the same length, developing a sequence of groups of N enciphering pulses at the transmitter by scanning the signals stored on one set of carriers, combining the sequence of enciphering pulses with successive groups of N mark and space signals significant of the amplitudes of the different frequencies of the message, transmitting the enciphered groups of N mark and space signals to a receiving station, scanning the signals stored on the second set of carriers at the receiving station in synchronism with the scanning of the set at the transmitter to develop an identical sequence of groups of N deciphering pulses, combining the groups of deciphering pulses with the received signals to develop a duplicate of the code groups of N mark and space signals significant of the amplitudes of the different frequencies of the message, and converting said duplicate code groups back to the original message.

7. A method for keeping secret speech in communication channels, as recited in claim 1, and which includes the further steps of combining with the code pulse combinations of said second signal an invariable sequence of different enciphering pulse code combinations, and repeating said sequence by switching mechanically at a repetition rate greater than five per second.

8. A method for keeping secret speech in communication channels, as recited in claim 1, and which includes the further step of storing the sequence of enciphering or deciphering code impulse combinations for the time interval equal to at least the entire period required for transmission of a long message signal.

References Cited in the file of this patent

UNITED STATES PATENTS

| | | |
|---|---|---|
| 2,272,070 | Reeves | Feb. 3, 1942 |
| 2,401,855 | Briggs et al. | June 11, 1946 |
| 2,419,568 | Labin | Apr. 29, 1947 |
| 2,496,317 | Smith | Feb. 7, 1950 |
| 2,527,649 | Peterson | Oct. 31, 1950 |
| 2,537,843 | Meacham | Jan. 9, 1951 |
| 2,543,116 | Llewellyn | Feb. 27, 1951 |
| 2,570,220 | Earp et al. | Oct. 9, 1951 |